Sept. 14, 1943.  W. I. GLADFELTER ET AL  2,329,263
ROLL COATING MACHINE
Filed July 15, 1940  7 Sheets-Sheet 2

Inventors
Wiltie I. Gladfelter
William H. Moore.

Patented Sept. 14, 1943

2,329,263

UNITED STATES PATENT OFFICE 2,329,263

ROLL COATING MACHINE

Wiltie I. Gladfelter and William H. Moore, Philadelphia, Pa., assignors to Crown Cork & Seal Company, Inc., Baltimore, Md., a corporation of New York Application July 15, 1940, Serial No. 345,668

18 Claims. (Cl. 91—50)

The present invention relates to a machine for coating the surfaces of cylindrical articles with a liquid or semi-fluid coating material. More particularly, the invention relates to a machine for applying a uniform coating to the cylindrical side walls of containers, such as sheet metal cans. In the specific embodiment of the invention shown in the accompanying drawings and described below, the machine is adapted to coat with lacquer, varnish or the like, the surfaces of relatively tall, drawn, seamless can bodies of the type shown in the applications of Calleson et al., Serial Nos. 129,068, 280,650, and 334,876, filed, respectively, March 4, 1937, June 2, 1939, and May 13, 1940.

It is an object of the present invention to provide a machine that will apply to such articles a smooth, continuous coating of lacquer or the like, at high enough speeds to keep pace with other machines in a can-making line.

It is a further object of the invention to provide a machine that will perform these functions in a simple and expeditious manner. To this end, the invention provides a machine that is extremely simple in construction and not likely to get out of order or to require replacements of parts or repair.

It is a further object of the invention to provide a machine that will take containers in a container manufacturing line and present them rapidly and successively to roll coating instrumentalities, while supporting the containers for rotation about their axes, so that a coating of lacquer or the like may be applied by a rolling operation to their cylindrical side walls.

It is a further object of the invention to provide a machine of this type that will apply a plurality of layers or coats to each container, thereby entirely obliterating any lap marks, or the like.

It is a further object of the invention to provide adjustable means for varying the number of rotations made by each container when in rolling contact with the coating roll.

A further object of the invention is to provide improved means for maintaining a uniform film of accurately controlled, adjustable thickness upon the coating roll of the machine.

A further important object of the invention is to provide a machine wherein the containers are positively rotated in rolling contact with a coating roll, but wherein the rotational force imparted to the containers is not transmitted thereto primarily through the surfaces to be coated, but, instead, to the container supporting means and thence to the containers.

A further object is to provide a machine wherein the pressure between the surfaces of the containers to be coated and the coating roll is accurately determined and positively limited. To this end, the movement of the containers toward the rubber surface of the coating roll is definitely limited by metal to metal contact between the peripheries of discs mounted coaxially with the coating roll and the containers, respectively, the discs being arranged to limit the pressure between the metallic surfaces of the containers and the rubber surface of the coating roll.

Other and further objects and advantages of the invention will be apparent from a consideration of the following description of a specific embodiment of the invention, shown in the accompanying drawings and described below.

General organization and driving means

The machine of the specific embodiment shown in the drawings comprises a main support made up of side frame elements 20, 21, held together in predetermined spaced relation by a plurality of transverse tie rods 22. The frame members include upwardly projecting pedestals 23, 24 carrying a cross-shaft 25 upon which a can supporting turret, represented generally at 26, is journalled for rotation.

The side frames 20, 21 are provided adjacent their upper ends with horizontally extending slideways 27, 28, upon which the roll coating assembly, represented generally at 30, is slidably mounted for adjustment toward and from the turret 26.

Containers are delivered to the turret 26 by a gravity chute 31 and are picked up by chuck assemblies carried by the turret and described below. The containers, during their volution about the axis of the turret, are presented successively to a coating roll 32, associated with the coating assembly, and are maintained in rolling contact therewith for a sufficient time to have their surfaces completely coated by the roll. Thereafter, the containers are deposited by the turret in article receiving pockets 33 of a discharge conveyor 34, by which they are conveyed to the next machine in the line, such as a neck-spraying machine or a baking oven.

The coating assembly includes side frame elements 35, 36 supported upon the slideways 27, 28 and held in predetermined spaced relation by transverse tie rods 37 and a transverse rear end member 38 having its ends disposed in cut-out portions 39 of the side frames 20, 21.

The upper surface of each side frame members 35, 36 is provided with a plurality of seats for the transverse shafts which carry the rolls of the coating assembly. The coating roll 32 is fixed upon a transverse shaft 40, journalled for rotation in bearings 41, 42, while the transfer roll 45 (Fig. 4) has a sleeve-like hub 46 journalled by bearings 47, 48 upon a stationary shaft 49, supported by means hereinafter described on the side frame members. The pick-up roll 50 likewise has an extended, sleeve-like hub 51, journalled by bearings 52, 53 upon a transverse shaft 54 carried by the side frames. The coating roll shaft 40 and the hub extensions 46 and 51 carry intermeshing spur gears 55, 56, 57, respectively, thereby the rolls rotate in unison. The gears are of substantially the same diameter as the respective rolls, so that the rolls rotate at the same peripheral speed.

A stub shaft 58, journalled in a bearing assembly 59, carried by the supplemental side frame member 36, has a pinion 60 fixed upon its inner end in mesh with the spur gear 55 and a pulley 61 on its outer end, receiving rotation from a belt 62, driven by means hereinafter described. Thus, when the pulley 61 is driven, rotation is imparted by the shaft 58 and pinion 60 to the spur gears 55, 56 and 57 and to the associated rolls.

Figure 6:
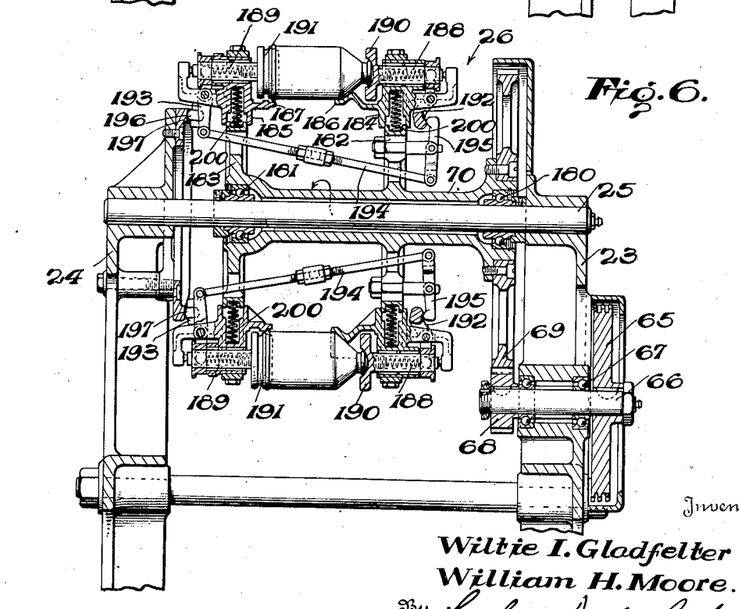

A flexible driving chain 63 is trained about a sprocket 64 fixed on the stub shaft 58 and about a sprocket 65, carried by a second stub shaft 66 (Fig. 6) journalled in bearings 67 in the main frame 23. The stub shaft 66, in turn, carries a pinion 68 on its inner end, in mesh with a large spur gear 69 carried by the sleeve-like hub extension 70 of the turret 26.

A slack take-up sprocket 71 (Fig. 1) carried by a lever 72 pivoted to the frame member 36, is urged downwardly into tension producing engagement with the chain 63 by weights 73 threaded on a bolt 74 carried by the lever 71. Thus, although there is sufficient slack in the chain 63 to permit adjustment of the coating assembly and the driving sprocket 64 relative to the turret and the fixed drive sprocket 65, the chain is maintained under proper driving tension at all times by the weighted idler sprocket 71.

Figure 1:
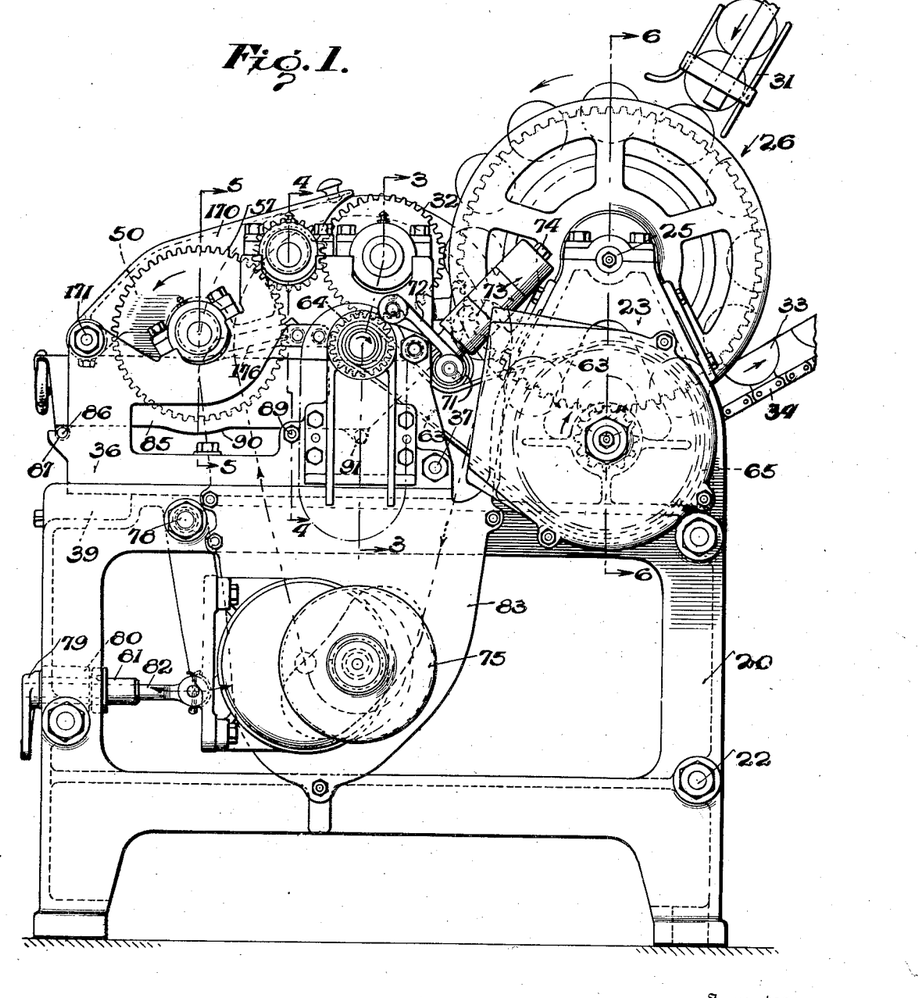
Figure 1 is a side elevation of the machine, with certain parts removed for the sake of clarity.
Figure 7:
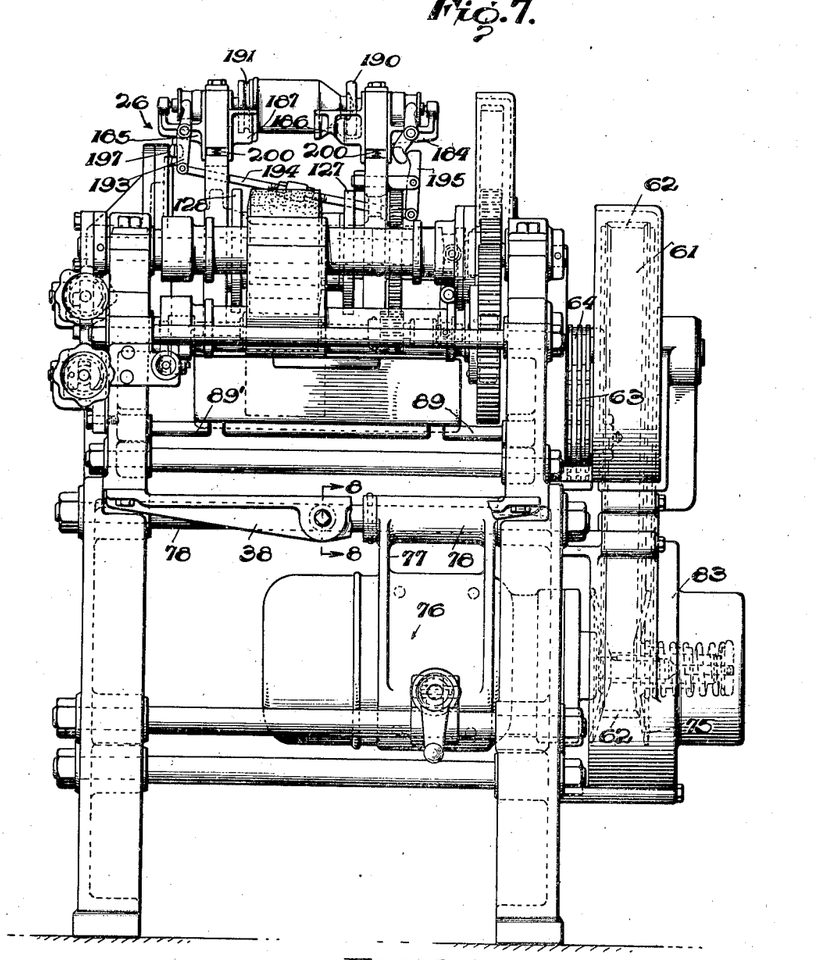
Figure 7 is a rear end elevation, looking from the left of Figure 1.

The main driving belt 62, trained about the pulley 61, is driven by a pulley 75, known as a Reeves variable speed transmission. As shown in Figures 1 and 7, a driving motor 76 is carried by a bracket 77 pivoted to a transverse tie rod 78 associated with the main frame 20. The motor 76 drives the pulley 75 through suitable reduction gears or the like. The position of the motor and the variable speed pulley 75 may be changed by means of a handle 79 journalled in a bracket 80, the handle having a sleeve extension 81 in which a link 82 connected to the motor bracket 77 is threaded. The angular position of the motor and pulley relative to the pivot 78 determines the effective diameter of the pulley, as one of the heads of the pulley moves inwardly or outwardly under the influence of a spring, in a well known manner. Hence, the speed ratio between the pulley 75 and the pulley 61 may be changed at will by shifting the angular position of the motor relative to the pivot 78, the shifting being effective by rotation of the handle 79 and the sleeve 81.

A guard casing 83 encloses the pulleys 75, 61 and the belt 62, while a similar casing 84 encloses the sprocket 65 and the chain 63.

The coating assembly

Figure 4:
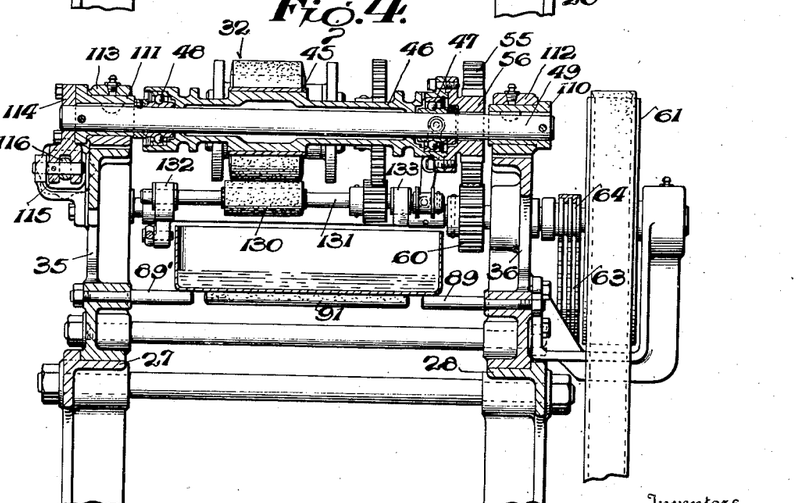

As stated above, the coating assembly comprises side frame members 35, 36 slidably mounted upon the main frame slideways 27, 28, and held together by transverse tie rods 37. A coating material reservoir 85 is supported between the side frames 35, 36, by a transverse rod 86 welded to its bottom and having laterally projecting ends of reduced diameter which are received in sockets 87 formed in brackets 88 carried by the rear faces of the side frames 35, 36. At a forwardly disposed point, the pan 85 is supported by stud rods 89, 89', bolted to the side frames, as shown in Figure 4. The pan has a depression 90 in its lower surface directly below the pick-up roll 50 and adjacent its forward end carries a transverse stiffened rod 91 which, with the rod 86, serves as a means to support the pan when it is removed from the machine, to prevent the pan wobbling on the depression 90, which otherwise would contact a table or other supporting surface. The pan may readily be removed by lifting the ends of the rod 86 from the sockets 87 and withdrawing the pan bodily from the machine.

Figure 2:
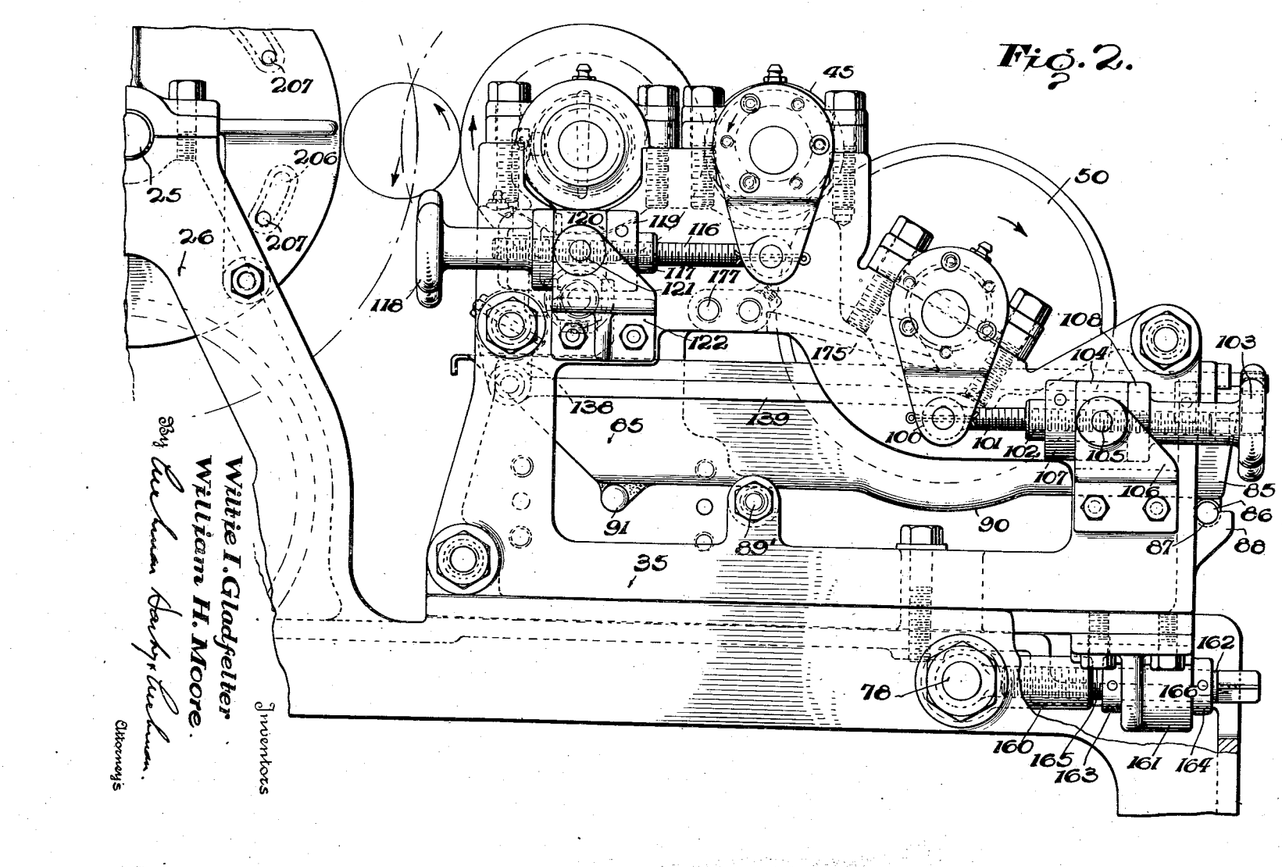
Figure 2 is an enlarged, side elevational view of the coating assembly, looking from the opposite side of the machine.
Figure 5:
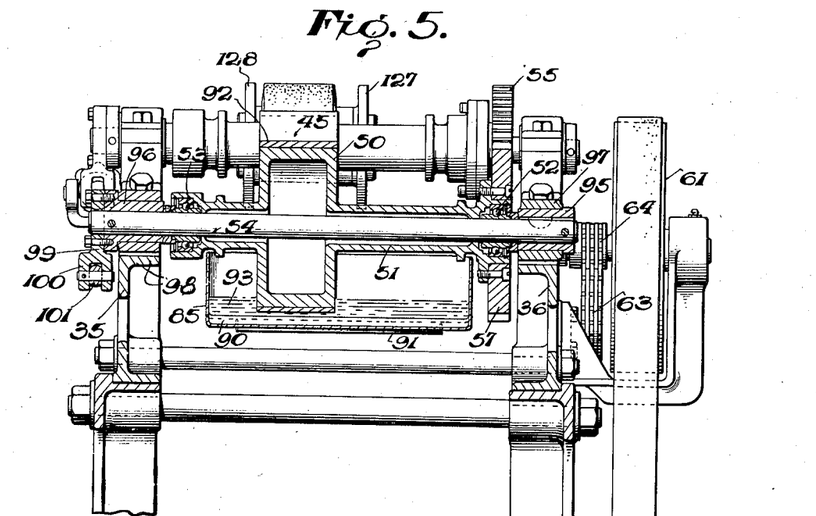

Referring to Figure 5, the pick-up roll 50, journalled upon the shaft 54, is provided with a smooth, accurately machined stainless steel rim 92, dipping into the liquid coating material 93 in the reservoir 85. In order to permit accurate adjustment of the clearance between the periphery of the pick-up roll 50 and the transfer roll 45, eccentric sleeves 95, 96 are fixedly secured to the ends of the shaft 54 and are supported in bearings 97, 98 carried by the side frames 35, 36. A plate 99 having a depending bifurcated arm 100 is secured to the outer face of the eccentric 96, while a rearwardly projecting threaded adjusting link 101 is secured thereto. As indicated in Figure 2, the link 101 is threaded in a sleeve 102, having a hand wheel 103 at its rear end and being journalled in a collar 104 pivotally mounted on a pin 105 projecting laterally from a bracket 106 secured to the side frame 35. A lock ring 107 secured to the sleeve 102 abuts one face of the collar 104 to prevent longitudinal movement of the sleeve relative to the collar, while an outwardly projecting flange 108 on the sleeve abuts the other face of the collar. Hence, by rotating the hand wheel 103 and sleeve 102 in one direction or the other, the threaded link 101 is advanced or retracted and the shaft 54 and the eccentrics 95, 96 are angularly adjusted, thereby to shift the position of the pick-up roll 50 relative to the side frame bearings 95, 96.

As indicated in Figure 4, the transfer roll 45 is similarly mounted, so that its position relative to the pick-up roll 50 and the coating roll 32 may be adjusted with extreme nicety. The shaft 49 has eccentric sleeves 110, 111 fixed upon its ends and mounted in bearings 112, 113 carried by the side frames 36 and 35. The eccentric 111 carries an operating plate 114 on its outer face, the plate having depending, bifurcated arm 115 connected to a forwardly projecting threaded link 116. As shown in Figure 2, the link is disposed within an interiorly threaded sleeve 117 having an operating handle 118 at its forward end and a retaining ring 119 adjacent its other end. The sleeve 117 is journalled in a collar 120 pivoted upon a pin 121 carried by a bracket 122 bolted to the side frame 35. Hence, when the handle 118 is rotated, the threaded link 116 is advanced or retracted to shift the position of the shaft 49 and the eccentric bushings 110, 111, thereby to vary the position of the transfer roll 45 relative to the side frame bearings 112, 113, the pick-up roll 50 and the coating roll 32.

Figure 3:
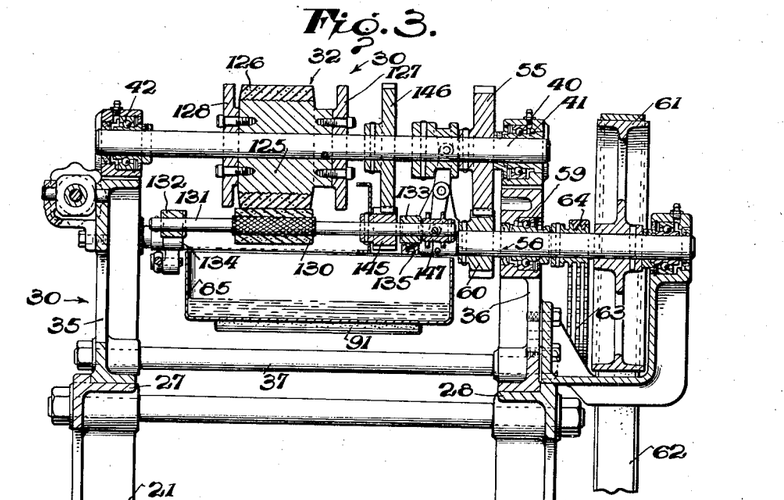
Figures 3, 4, 5 and 6 are vertical sections taken substantially on the corresponding section lines on Figure 1.

As previously pointed out, the coating roll 32 (Fig. 3) is fixed upon the shaft 40 and the latter is journalled for rotation in bearings 41, 42 carried by the side frame members 36, 35. The coating roll preferably comprises a solid cast metal core or body 125 having a roughened outer surface and a semi-hard rim 126 of rubber compound vulcanized directly upon the core and having its outer surface accurately ground on the axis of the shaft 40 as a center. The end faces of the core 125 carry driving discs or rollers 127, 128 having their peripheral surfaces disposed substantially on a continuation of the peripheral surface of the coating roll. As hereinafter explained, the discs or rollers 127, 128 make driving engagement with similar elements carried by the can-holding chucks to impart rotation thereto and to limit the approach of the cans toward the coating roll periphery, and the pressure between the cans and the coating roll.

Below the coating roll 32, there is disposed an axially reciprocable distributor roll 130 fast upon a shaft 131 journalled for rotation and for axial movement in bearing blocks 132, 133 slidably mounted in arms 134, 135 carried by a transverse rock shaft 136 (Fig. 9) journalled in the side frames 35, 36. Beneath each bearing block 132, 133, there is a coil compression spring 137, urging the associated block, the shaft 131 and the distributor roll 130 upwardly. The rock shaft 136 carries a depending arm 138 to which a link 139 is attached, the latter being extended rearwardly and supported in an apertured plate or bracket 140 carried by the rear end of the side frame 35. Upon the threaded rear end of the link 139, there is an adjusting nut 141 bearing against the plate 140, whereby the link may be drawn rearwardly (toward the right in Figure 9), to oscillate the rock shaft 136, raise the arms 134, 135 and increase the pressure applied by the springs 137, thereby to increase the pressure between the distributor roll and the surface of the coating roll.

The distributor roll shaft 131 carries an axially elongated pinion 145 (Figs. 3 and 11) in mesh with a spur gear 146 fast upon the coating roll shaft 40, whereby rotation is imparted to the shaft 131 and roll 130 from the coating roll shaft.

In addition, a shifting collar 147 (Figs. 10 and 11) is fixed upon the end of the shaft 131, while a collar 148 having a cam groove 149 therein is positioned thereabove, fast upon the coating roll shaft 40. An upstanding bracket 150, secured to the adjacent tie rod 37, carries a pin 151 upon which a lever 152 is pivotally mounted, the upper end of the lever having a cam following roller 153 disposed in the cam groove 149 and the lower end of the lever having a similar roller 154 disposed in the peripheral groove of the shifting collar 147. Hence, as the coating roll shaft 40 rotates, the lever 152 is oscillated by the cam 149, with the result that axial reciprocations are imparted to the distributor roll shaft 131 and the distributor roll 130.

Figure 8:
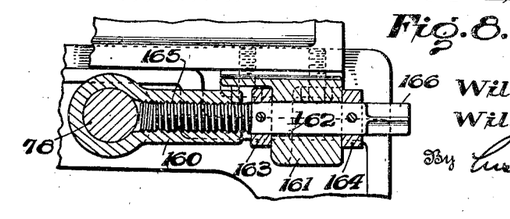
Figure 8 is a sectional detail taken substantially on line 8—8 of Figure 7.

As stated above, the entire coating assembly is mounted for adjustment relative to the can-holding turret, the assembly being slidably mounted upon the main frame, as aforesaid. Referring to Figures 2, 7 and 8, the main frame tie rod 78, from which the motor bracket 77 is suspended, has secured thereon a rearwardly projecting internally threaded sleeve 160. The transverse end member 38 of the coating assembly frame has a centrally positioned depending apertured boss 161, in which a threaded pin 162 is journalled, the pin being restrained against axial movement relative to the boss by collars 163, 164 and having its forward end 165 threaded into the sleeve 160 and its rear end 166 squared or otherwise shaped to receive a wrench or the like. Hence, when the threaded shaft 162 is rotated, the transverse frame member 38 and the entire coating assembly are moved longitudinally with respect to the main supporting frame and the can-holding turret, for purposes hereinafter described.

The coating assembly is provided with a cover or guard 170 (Fig. 1) pivoted to the side frames 35, 36 at the rear end upon a transverse shaft 171. The guard has depending side walls positioned inwardly of the side frame members 35, 36 and the bearings for the several roll shafts, while the top surface of the guard extends upwardly over the pick-up roll 50, the transfer roll 45 and a portion of the coating roll 32, to prevent the access of foreign matter to the reservoir 85 and also to prevent splashing or other inadvertent discharge of coating material from the peripheries of the rolls.

Figures 9, 9A, 10, 11:
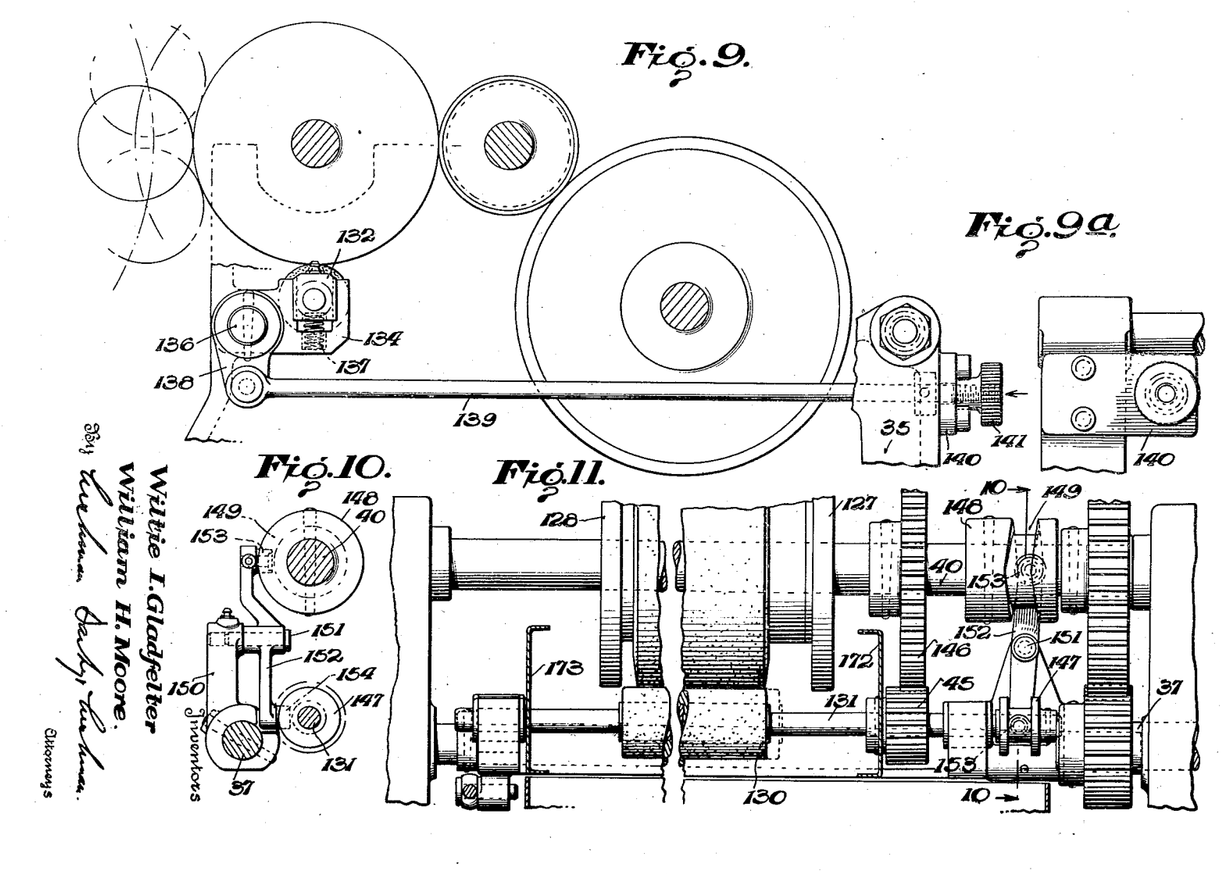
Figure 9 is a fragmentary side elevation, somewhat diagrammatic in character, showing the supporting means for the distributor roll.
Figure 9a is an elevational detail, taken from the right of Figure 9.
Figure 10 is an elevation, partly in section, showing a preferred mechanism for reciprocating the distributor roll, taken on line 10—10 of Figure 11.
Figure 11 is an enlarged, fragmentary elevation showing the relation of the coating roll, the distributor roll, and associated parts.

As indicated in Figure 11, longitudinally extending guards 172, 173 are disposed above the pan, to prevent the liquid coating material from being thrown upon the gears for the roll shafts or upon the bearings.

Scraper blades 175, 176 (Figs. 1 and 2) are carried by transverse tie rods 177 and are positioned in engagement with the heads of the pick-up roll 50, to prevent accumulation of the coating material thereupon.

*The article holding turret*

The turret for the containers represented generally at 26 (Fig. 6) comprises a central hub 70, journalled as aforesaid upon the shaft 25 by bearings 180, 181. The turret includes two spaced outwardly projecting heads 182, 183, carrying a plurality of radially movable brackets 184, 185, having inwardly projecting flanges 186, 187 forming pockets adapted to receive the containers from the infeed conveyor 31. Associated with the brackets 184, 185 are rotatably mounted spindles 188, 189 carrying can-engaging chuck elements 190, 191, urged by appropriate springs toward the adjacent ends of the can in the can-receiving pockets. Levers 192, 193, pivoted to the brackets, have bifurcated ends engaging shifting collars on the spindles, whereby, upon oscillation of the levers, the chuck elements are withdrawn to can disengaging position against the force of the spindle springs, referred to above. The levers are interconnected by an adjustable link 194 and a reversing lever 195, so that, as the lever 193 is oscillated by the engagement of a roller 197 carried thereby with a stationary cam 196, during rotation of the turret, motion is transmitted to the lever 192 and the chuck elements 190 and 191 are both moved toward or away from the can in unison.

Springs 200 urge the brackets 184, 185 radially outwardly to their outer limit of movement, but permit inward movement of the brackets, the chuck spindles and the containers when in roll coating relation to the coating roll 32. It should be noted that the chuck elements 190, 191 have disc-like portions provided with peripheral surfaces substantially equal in diameter to and arranged coaxially of the containers supported thereby. These elements are disposed in alignment with the driving discs or rollers 127, 128 carried by the coating roll and are adapted to be driven thereby, to rotate the spindles and the containers when the latter are in coating relation to the coating roll.

Figure 14:
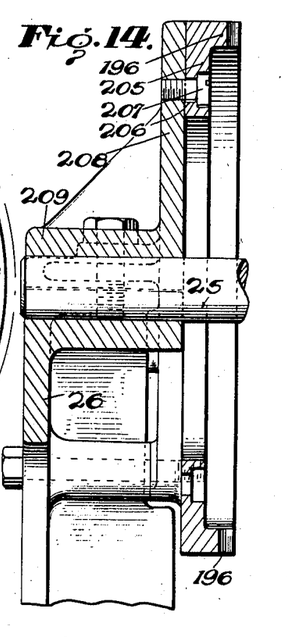
Figure 14 is a vertical section on line 14—14 of Figure 13, and Figures 15, 16 and 17 are fragmentary sectional views taken on the corresponding section lines on Figure 12.

The chuck operating cam 196, formed integrally with a ring 205 having a plurality of shouldered, arcuate slots 206 formed therein, is supported for angular adjustment by bolts 207 relative to a flange element 208 preferably formed integrally with a clamping cap 209 which secures the shaft 26 upon the pedestal 25. The bolts 207 are threaded into the flange 208 with the head disposed above the shoulders in the slots as shown in Figure 14. Thus, by adjusting the angular position of the cam ring, the points of opening and closing movements of the chucks in the cycle of revolution of the turret may be changed.

The details of construction of the can-holding chucks and the means for actuating the same, illustrated in the accompanying drawings and described above, are not essential parts of the present invention, since the can-holding turret and the construction of chuck assemblies shown in the copending application of Gladfelter and Hauger, Serial No. 342,568, filed June 26, 1940, or any equivalent construction, may be substituted.

Operation

Figure 12:
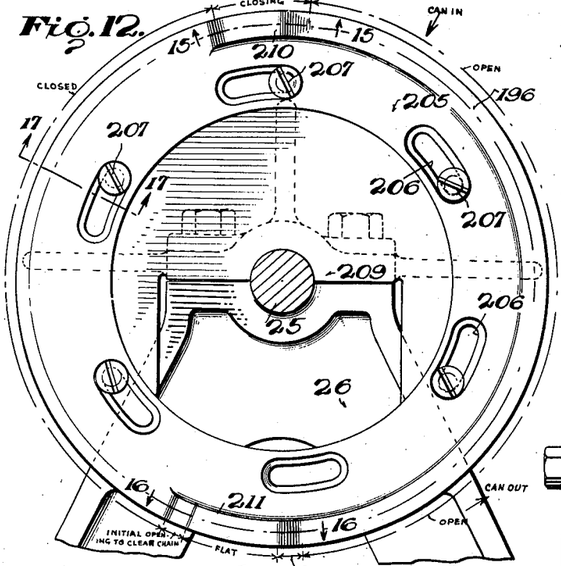
Figure 12 is an elevational view of a cam ring and its adjustable supporting means.
Figure 13:
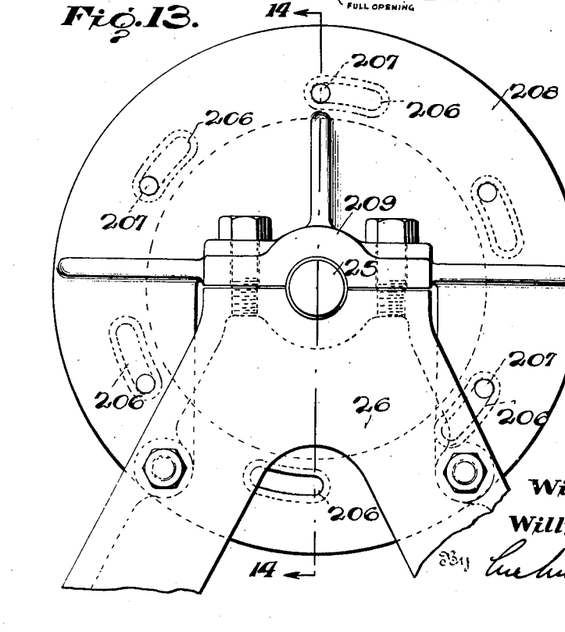
Figure 13 is a rear face view of the cam supporting elements.
Figure 15:
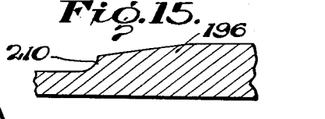
Figure 16:
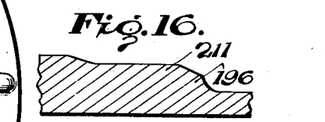
Figure 17:
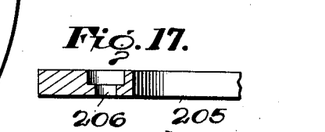

In the operation of the embodiment of the invention described above, the containers are received by pockets 186, 187 in the turret, as the turret rotates past the infeed chute 31. The cam 196 at this point has withdrawn the chuck elements 190, 191 so that the containers may drop into the pockets. When reaching the position indicated at 210 in Figure 12, the cam following rollers 197 drop into a depression on the face of the cam (Fig. 15), thereby permitting the chuck elements to move inwardly to support the cans by their ends, out of contact with the pockets 186, 187. The containers are now supported for free rotation about their own axes. The containers follow an arcuate path of movement upon revolution of the turret, until they intersect the arc of the circumference of the coating roll 32, at which time the peripheries of the chuck elements 190, 191 contact the driving discs 127, 128 associated with the coating roll. During continued rotation of the turret, the chucks, the containers, and the brackets 184, 185 move radially inwardly and follow the intersecting arc of the coating roll periphery. As the containers leave the coating roll, of course, these elements all move outwardly again to the initial position. When the chucks reach the position represented at 211 in Figure 12, the cam following rollers 197 encounter a rise in the cam 196, whereupon the can-engaging chuck elements are withdrawn and the cans are deposited by gravity upon appropriate supporting brackets 33 associated with the out-feed conveyor 34.

A continuous layer of coating material is maintained upon the coating roll by the pick-up roll and the transfer roll, the coating being maintained uniform by the reciprocating distributor roll 130. As a result of the adjustments heretofore described, the thickness of the layer of coating material may be accurately controlled.

It will be evident from a consideration of the relative size and position of the pulleys, gears and sprockets in Figure 1, that the coating roll 32 rotates far more rapidly than the turret and in the same direction (counterclockwise in Figure 1). Thus, as the containers approach the coating roll by downward movement on the turret, the adjacent face of the roll is moving upwardly at high speed. When the containers and the chuck spindles contact the roll and the driving discs 127, 128, the containers and chucks are driven primarily by the driving engagement between the discs and chucks, with the result that the containers make rolling contact with the coating roll during their movement along the intersecting arc of the surface of the roll, which movement is permitted by the radial inward movement of the chucks and containers relative to the turret. The speed of rotation of the coating roll is preferably such that each container makes between two and three and one-half rotations while in rolling contact therewith, thereby to eliminate any lap marks or the like showing a line of commencement of the coating operation.

In addition to imparting positive rotational movement to the containers in rolling contact with the coating roll, the chuck elements 190, 191 and the driving discs 127, 128 limit the pressure applied between the surfaces of the containers and the coating roll. The springs 200 which urge the chucks radially outwardly would apply a varying pressure between the containers and the coating rolls, were it not for the fact that the movement of the containers inwardly toward the center of the coating roll is definitely limited by the metal to metal contact between the peripheries of the chuck elements 190, 191 and the discs 127, 128. Hence, the containers make only a desired, predetermined coating contact with the rubber surface of the coating roll.

The number of rotations made by the containers while in engagement with the coating roll may be varied by adjusting the position of the coating assembly relative to the can-holding turret, since this adjustment varies the length of the intersecting arc of the coating roll followed by the containers during their movement with the turret. By moving the coating assembly nearer to the center of the turret, the containers move radially inwardly of the turret an increased distance and follow a longer arc on the surface of the coating roll, while, if the coating assembly is moved away from the turret, the length of the arc is decreased. The length of the intersecting arc and the ratio of rotational speed between the coating roll and the turret jointly determine the number of rotations made by the containers while in contact with the coating roll. Since the speed ratio is normally maintained constant, adjustments are ordinarily made by changing the position of the coating assembly relative to the turret.

Although the invention has been described with considerable particularity, by reference to the specific embodiment illustrated in the accompanying drawings, it must be understood that the invention is not limited to the details of construction shown therein and described above, but covers all modifications coming within the scope of the appended claims and their equivalents.

We claim:

1. A machine for coating the surfaces of cylindrical articles comprising a revolvable turret, means for supporting articles thereon for revolution therewith, for radial movement with respect thereto and for rotation about their axes, a coating roll adjacent the turret, means for continuously revolving the turret to move the containers successively along a path in contact with the roll and overlapping its surface, means for continuously rotating the roll and the containers in moving contact therewith, thereby to make rolling contact therebetween, and means for continuously maintaining a layer of coating material on the roll.

2. A machine for coating the surfaces of cylindrical articles comprising a revolvable turret having a plurality of circumferentially arranged, radially movable, article receiving chucks rotatably supported thereon, a coating roll supported adjacent the turret for radial adjustment with respect to the path of movement of the articles in the chucks, means for continuously rotating the roll, means for continuously rotating the turret, the turret and the roll being so positioned that the paths of travel of the chucks and the coating roll overlap as the articles move into contact with and move along the surface of the roll and the chucks move radially relative to the turret, and means for maintaining a layer of coating material on the coating roll.

3. A machine for coating the surfaces of cylindrical articles comprising a revolvable turret having a plurality of circumferentially arranged, radially movable, article receiving chucks rotatably supported thereon, a coating roll supported adjacent the turret for radial adjustment with respect thereto, means for revolving the turret to move the articles in said chucks successively along a path into engagement with the roll and following the roll periphery upon radial movement of the chucks, means for rotating said roll and the articles in contact therewith, and means for adjusting the radial position of the coating roll relative to the turret to vary the length of the path of movement of the articles in contact with the roll periphery.

4. A machine for coating the surfaces of cylindrical articles comprising a turret, means for continuously revolving the turret, a plurality of article receiving chucks, means for mounting the chucks on the turret for rotation about their own axes and for limited radial movement relative to the turret axis, a coating roll having a part of its periphery disposed on an arc intersecting the arc of revolution of the articles in the chucks, whereby the articles engage and follow the intersecting arc of the roll surface and move with their chucks radially relative to the turret axis during revolution of the turret, and means for continuously rotating the roll, thereby establishing continuous rolling contact between the surface thereof and the containers while the latter are moving along said intersecting arc in engagement with the roll.

5. A machine for coating the surfaces of cylindrical articles comprising a revolvable turret, a plurality of article receiving chucks, means for mounting the chucks on the turret for rotation about their axes and for limited radial movement relative to the turret axis, means for continuously revolving the turret, a coating roll journaled for rotation on an axis spaced from and parallel to the axis of revolution of the turret and having a part of its periphery disposed on an arc intersecting the arc of revolution of the articles in the chucks, whereby the articles engage and follow the intersecting arc of the roll surface during revolution of the turret, means for continuously rotating the roll and establishing rolling contact between the surface thereof and the containers while moving along said intersecting arc, and means for varying the space between the axes of the turret and of the roll, thereby to vary the length of said intersecting arc and the number of rotations made by each article while in contact with the roll.

6. A machine for coating the surfaces of cylindrical articles comprising a revolvable turret, a plurality of article receiving chucks, means for mounting the chucks on the turret for rotation about their own axes and for limited radial movement relative to the turret axis, a coating roll having a portion of its periphery disposed on an arc intersecting the arc of revolution of the articles in the chucks, whereby the articles engage and follow the intersecting arc of the roll surface during revolution of the turret, means for continuously revolving the turret and for continuously rotating the roll a predetermined number of times faster than the turret, thereby to establish rolling contact between the roll and the containers while the latter move along said intersecting arc, and means for adjusting the radial position of the coating roll relative to the turret, thereby to vary the length of said intersecting arc and the number of rotations made by the articles while in said rolling contact.

7. A machine for coating the surfaces of cylindrical articles comprising a revolvable turret, a plurality of article receiving chucks, means for mounting the chucks on the turret for rotation about their own axes and for limited radial movement relative to the turret axis, each chuck carrying a pair of coaxial driven rollers for imparting rotation thereto, a coating roll journalled for rotation with a part of its periphery disposed on an arc intersecting the arc of revolution of the articles in the chucks, said coating roll carrying coaxial driving rollers in alignment with the chuck rollers, means for continuously rotating the coating roll and the driving rollers, and means for continuously revolving the turret to cause the articles successively to engage and follow the intersecting arc of the coating roll periphery as the chucks move radially inwardly relative to the turret and to establish driving relation between said driving and driven rollers, whereby the articles make rolling contact with the coating roll as they move along said intersecting arc.

8. A machine for coating the surfaces of cylindrical articles comprising a revolvable turret, a plurality of radially movable article receiving chucks rotatably mounted thereon for revolution therewith, each chuck carrying a pair of coaxial driven rollers for imparting rotation thereto, a coating roll journalled for rotation with its periphery disposed on an arc intersecting the arc of revolution of the articles in the chucks, said coating roll carrying coaxial driving rollers in alignment with the chuck rollers, means for rotating the coating roll and the driving rollers, means for revolving the turret to cause the articles successively to engage and follow the intersecting arc of the coating roll periphery and to establish driving relation between said driving and driven rollers, whereby the articles make rolling contact with the coating roll as they move along the intersecting arc of the coating roll periphery, and means for adjusting the position of the coating roll radially of the turret to vary the length of said intersecting arc and the number of rotations made by the articles while in rolling contact with the roll.

9. A machine for coating the surfaces of cylindrical articles comprising a supported frame, a turret journalled for rotation about a horizontal axis fixed with respect to said frame, a plurality of article receiving chucks, means for mounting the chucks on the turret for rotation about their own axes and for limited radial displacement relative to the turret axis, a supplemental frame slidably mounted upon the main frame for movement toward and away from the turret, a coating roll journalled for rotation upon the supplemental frame on a horizontal axis parallel to the turret axis and having a part of its periphery disposed upon an arc intersecting the arc of revolution of the articles on the turret, and means for accurately adjusting the position of said supplemental frame and said coating roll relative to the turret to vary the length of said intersecting arc.

10. A machine for coating the surfaces of cylindrical articles comprising a supporting frame, a turret journalled for rotation about a horizontal axis fixed with respect to said frame, a plurality of article receiving chucks, means for mounting the chucks on the turret for rotation about their own axes and for limited radial movement relative to the turret axis, a supplemental frame slidably mounted upon the main frame for movement toward and away from the turret, a coating roll journalled for rotation upon the supplemental frame on a horizontal axis parallel to the turret axis and having a part of its periphery disposed upon an arc intersecting the arc of revolution of the articles on the turret, and a screw-threaded element interconnecting the supplemental frame and the main frame and serving to adjust the position of the former and the coating roll relative to said turret to vary the length of said intersecting arc.

11. A coating machine comprising a rotatably mounted coating roll, means for presenting articles to be coated successively to the surface of the roll, a coating material reservoir, a pick-up roll dipping into the reservoir, a transfer roll between the pick-up roll and the coating roll, means for rotating said rolls, means for adjusting the clearance between the peripheries of the pick-up roll, the transfer roll and the coating roll, said means comprising eccentric supports for the pick-up roll and the transfer roll, and means for adjusting the angular positions of said supports.

12. A coating machine comprising an article receiving turret mounted for revolution about a fixed horizontal axis, a roll coating assembly movably mounted for adjustment toward and from said turret, and driving means for the coating assembly and for continuously revolving the turret, said driving means comprising a driving shaft carried by and movable with the assembly, intermeshing gears driven by said shaft for actuating the roll coating elements of the assembly, a shaft fixed with respect to and spaced from the axis of the turret for revolving the turret, and a flexible power transmission element interconnecting the adjustably mounted shaft and the fixed shaft for imparting rotation from the former to the latter.

13. A coating machine comprising an article receiving turret mounted for revolution about a fixed horizontal axis, a coating assembly mounted for adjustment toward and from said turret, and driving means for the coating assembly and for continuously revolving the turret, said driving means comprising a driving shaft carried by and movable with the assembly, intermeshing gears driven by said shaft for actuating the roll coating elements of the assembly, a shaft fixed with respect to and spaced from the axis of the turret for revolving the turret, a flexible chain interconnecting the adjustably mounted shaft and the fixed shaft for imparting rotation from the former to the latter, and a movably mounted idler sprocket in engagement with said flexible driving element to take up slack and maintain tension therein.

14. A roll coating machine comprising a reservoir for coating material, a rotatable pick-up roll dipping into the reservoir, a rotatable coating roll, a rotatable transfer roll between the pick-up roll and the coating roll, an axially reciprocable distributor roll having its periphery in contact with the periphery of the coating roll, and means driven by the rotation of coating roll for reciprocating the distributor roll.

15. A roll coating machine comprising a reservoir for coating material, a pick-up roll dipping into the reservoir, a coating roll, a transfer roll between the pick-up roll and the coating roll, an axially reciprocable distributor roll journalled for rotation with its periphery substantially in contact with the periphery of the coating roll, and means for reciprocating the distributor roll, said means comprising a cam rotatable with one of the first mentioned rolls, a peripherally grooved shifting collar movable with the distributor roll and a lever having one end in cam following relation to said cam and the other end disposed in operative engagement with the shifting collar.

16. A roll coating machine comprising a coating roll journalled for rotation about a fixed axis, an axially reciprocable distributor roll having its periphery in contact with the periphery of the coating roll, means for imparting axial reciprocations to the distributor roll, and means for adjustably pressing the distributor roll against the coating roll, said means comprising a rock shaft, a pair of arms projecting from the shaft, shaft supporting bearings carried by the arms, and means for adjusting the angular position of the rock shaft to move the bearings, the shaft and the roll toward or away from the coating roll.

17. In a coating machine, a coating roll journalled for rotation about a fixed horizontal axis, a distributor roll, and means for adjustably pressing the distributor roll against the periphery of the coating roll, said means comprising journal bearings for the distributor roll, movable supports behind the bearings, compression springs between the supports and the bearings, and means for adjusting the position of the supports to apply adjustable pressure from said springs to the bearings and the distributor roll.

18. A coating machine comprising a rotatable coating roll, a turret mounted for revolution adjacent the roll, a plurality of circumferentially arranged article receiving chucks on the turret, said chucks comprising axially movable members positioned to engage the ends of the articles and to support the same for rotation when in contact with said roll, a stationary cam plate adjacent the path of movement of the turret, cam following means carried by the chucks for controlling the movements of said axially movable end-engaging members, and means for angularly adjusting said stationary cam plate to vary the timing of the movements of said elements.

WILTIE I. GLADFELTER.
WILLIAM H. MOORE.